UNITED STATES PATENT OFFICE.

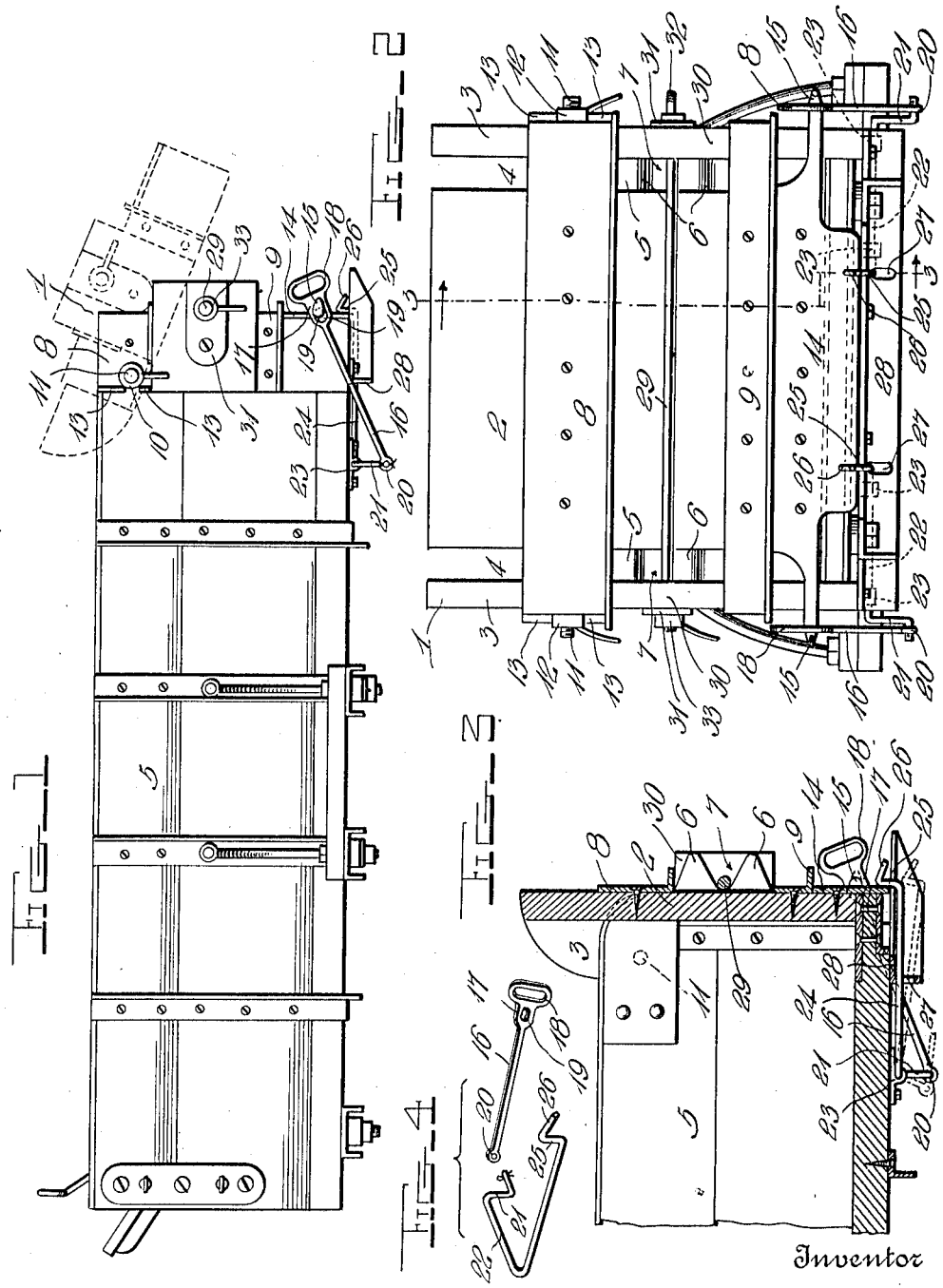

CHARLES SKIDMORE, OF HOMER, NEBRASKA.

END-GATE FOR WAGONS.

1,020,320.  Specification of Letters Patent.  Patented Mar. 12, 1912.

Application filed February 25, 1911. Serial No. 610,880.

*To all whom it may concern:*

Be it known that I, CHARLES SKIDMORE, a citizen of the United States, residing at Homer, in the county of Dakota and State of Nebraska, have invented certain new and useful Improvements in End-Gates for Wagons; and I do declare the following to be a full, clear, and exact description of the invention, such as will enable others skilled in the art to which it appertains to make and use the same.

This invention relates to improvements in end gates for wagons and means for fastening the gate in open and closed positions.

One object of the invention is to provide an end gate adapted to be pivotally and detachably connected to the end of a wagon body whereby the gate may be swung outwardly at its lower end.

Another object is to provide means whereby the gate may be fastened in its open position to permit the discharge of the contents of the wagon and means whereby the gate may be securely fastened at its lower end when in a closed position.

With these and other objects in view, the invention consists of certain novel features of construction, combination and arrangement of parts as will be more fully described and particularly pointed out in the appended claim.

In the accompanying drawings: Figure 1 is a side view of a wagon box or body showing the application of my improved end gate thereto; Fig. 2 is a rear end view of the same; Fig. 3 is a vertical cross sectional view on the line 3—3 of Fig. 2, showing in full lines the operative position of the fastening mechanism for holding the gate closed and in dotted lines the inoperative position of the fastening mechanism; Fig. 4 is a detail perspective view of the fastening devices for one side of the end gate showing the parts of the same disconnected.

Referring more particularly to the drawings, 1 denotes my improved end gate, said gate comprising a central portion 2 and side members 3. The side members 3 are in the form of boards of suitable width arranged at right angles to and spaced a suitable distance from the side edges of the central portion 2 leaving spaces 4 adapted to receive the rear ends of the sides 5 of the wagon body. The sides 5 of the wagon body are provided on the rear ends with extensions 6 which project beyond the rear side of the end gate and have formed therein notches 7 the purpose of which will be hereinafter described.

The side members 3 are secured to the central portion 2 of the gate and are held in spaced relation thereto by means of upper and lower angle iron bracing bars 8 and 9. The ends of the plates 8 and 9 are bent at right angles and engage the outer sides of the members 3, said plates being secured to the central portion 2 and side members 3 by screws or other suitable fastening devices. In the ends of the upper plate 8 and the adjacent portions of the side members 3 are formed horizontal inwardly extending bearing notches 10 which are adapted to be engaged with the laterally projecting ends of pivot bolts 11 secured at their inner ends in the adjacent sides of the wagon body and projecting laterally therefrom as shown. Adapted to be screwed onto the threaded outer ends of the bolts 11 are tail nuts 12 which when screwed up into engagement with the ends of the plate 8 will engage stop flanges 13 formed on the inner edges of the right angular ends of the plate 8 and thereby prevent the disengagement of the notched portions of the side members 3 and ends of the plate 8 from the pivot bolts 11, but will permit the end gate to be swung outwardly and upwardly at its lower end on said bolts, as clearly shown in dotted lines in Fig. 1 of the drawings. When the end gate has been swung upwardly and outwardly as shown the same may be secured in this position by tightly screwing the nuts 12 up on the bolts 11 thus clamping the side members 3 into tight engagement with the outer sides of the wagon box or body.

On the outer side of the central portion 2 of the end gate is secured a catch plate 14 the outer ends of which are cut away on the lower edge and are reduced and shaped to form rearwardly curved fastening hooks 15 with which are adapted to be engaged end gate fastening bars 16, said bars having on their outer ends keeper plates 17 and handle loops 18. In the plates 17 are formed elongated holes or eyes 18 which are adapted to be engaged with the hooks 15 as shown.

The inner ends of the fastening bars 16 have formed therein eyes 20 which are adapted to be engaged with cranks 21 formed on the outer ends of torsional spring rods 22 which are pivotally mounted in suitable bearings 23 secured to the bottom of the wagon adjacent to the opposite sides of the same. On the opposite ends of the rods 22 from the cranks 21 are formed right angular rearwardly projecting stop arms 24 having on their outer ends right angular upwardly projecting catch fingers 25 the upper ends of which are bent rearwardly at an angle as shown at 26. The ends of the stop arms 24 project through guide slots 27 formed in an angle iron bar 28 secured to the lower side of the bottom of the wagon adjacent to its rear end.

By means of fastening devices constructed as herein shown and described it will be seen that when the end gate is swung down to a closed position that the bars 16 may be drawn rearwardly and the apertures 19 in the plates 17 engaged with the hooks 15 on the catch plate 14. In thus drawing the bars 16 rearwardly the crank arms 21 will be swung rearwardly thus rocking the spring rods 22 and throwing the arms 24 up into engagement with the bottom of the wagon which will limit the pivotal movement of the spring rod 22 whereupon further pull on the bars 16 and crank arm 21 will exert a torsional strain on the rods 22 which will provide the necessary spring or resistance for holding the apertured plates 17 in operative engagement with the hooks 15 on the catch plate thus fastening the gate in closed position. When the stop arms 24 are thus thrown up into engagement with the bottom of the wagon the fingers 25 will be brought into engagement with the outer side of the catch plate 14 and will thus form additional fastening means for the lower end of the gate.

When it is desired to release the gate at its lower end the bars 16 are drawn back by the handles against the torsional resistance or spring of the rod 22 and the apertured plate 17 then disengaged from the hooks 15. After being thus disengaged the bars 16 are released thereby permitting the arms 24 to drop in the slots 27 of the plate 28 which will disengage the catch fingers 25 from the catch plate 14 whereupon the gate may be swung upwardly on the bolts 11 or may be entirely removed by disengaging the same from said bolts.

The side members 3 of the gate are braced by a tie rod 29 arranged across the rear side of the central portion 2 of the gate and through apertured extensions 30 formed on the rear edges of the members 3 and through wear plates 31 secured to said extensions. One end of the tie rod 29 has formed thereon an eye 32 while on the threaded opposite end is screwed a tail nut 33. The tie rod 29 when thus arranged will engage the notches 7 formed in the extensions 6 on the sides of the wagon body.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

An end gate for a wagon pivotally attached to the body of the wagon near its upper end and a catch plate secured to and forming its lower edge and provided with a finger projecting laterally beyond one side, in combination with a torsional spring rod transversely pivoted to the wagon body, a catch rod extending rearwardly at a right angle from one end of the spring rod, a catch finger on the outer end of the rod adapted to engage the catch plate, and means for bringing the torsional springing quality of the spring rod into play to maintain such engagement comprising a crank arm projecting downwardly from the other end of the spring rod, and a fastening bar attached to the end of the crank arm and provided with an opening to be engaged over the lateral finger of the catch plate.

In testimony whereof I have hereunto set my hand in presence of two subscribing witnesses.

CHARLES SKIDMORE.

Witnesses:
L. O. HILTON,
O. B. HOPKINS.

---

Copies of this patent may be obtained for five cents each, by addressing the "Commissioner of Patents, Washington, D. C."